July 3, 1962  N. G. CAMPBELL  3,042,769
FLUID FUEL FLOW CONTROL SYSTEM FOR FORCED DRAFT HEATING UNITS
Filed Oct. 13, 1960  2 Sheets-Sheet 1

INVENTOR.
NED G. CAMPBELL
BY
MAHONEY, MILLER & RAMBO
BY W. S. Rambo
ATTORNEYS.

July 3, 1962 — N. G. CAMPBELL — 3,042,769
FLUID FUEL FLOW CONTROL SYSTEM FOR FORCED DRAFT HEATING UNITS
Filed Oct. 13, 1960 — 2 Sheets-Sheet 2
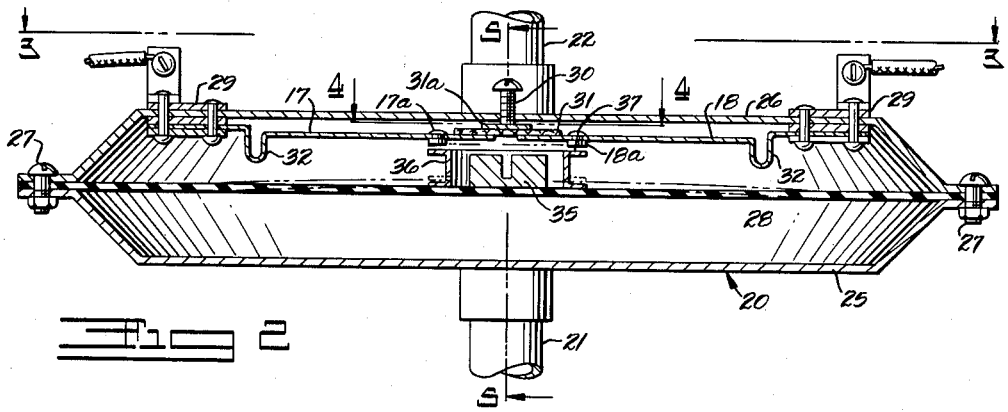
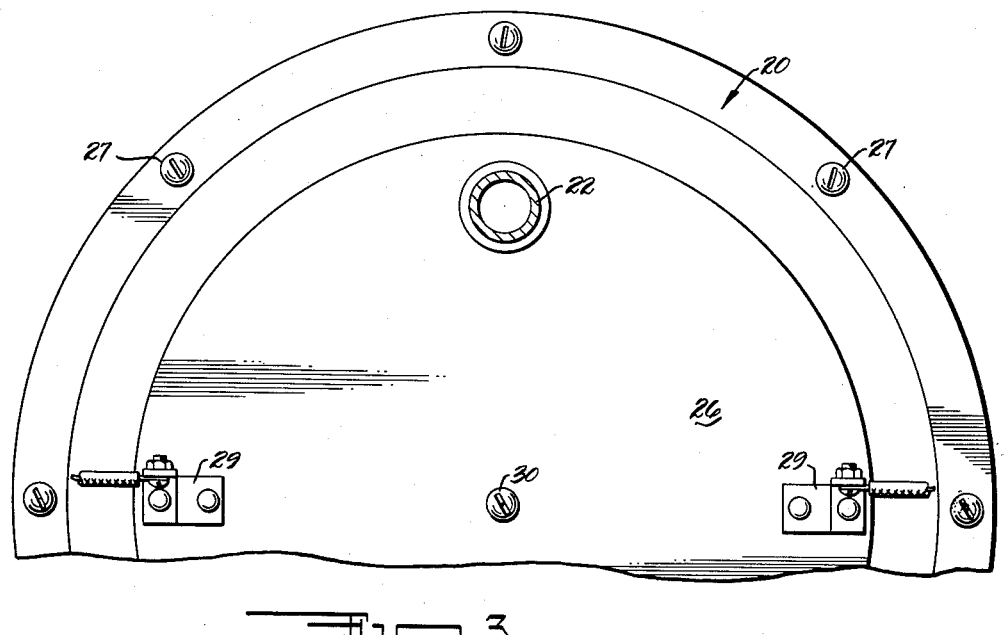
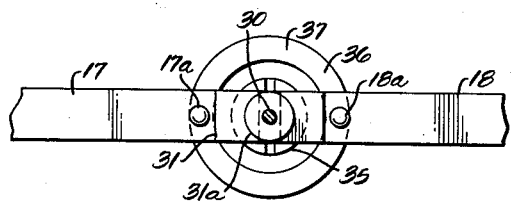
INVENTOR.
NED G. CAMPBELL
BY MAHONEY, MILLER & RAMBO
BY W. H. Rambo
ATTORNEYS.

United States Patent Office 3,042,769
Patented July 3, 1962

3,042,769
FLUID FUEL FLOW CONTROL SYSTEM FOR FORCED DRAFT HEATING UNITS
Ned G. Campbell, Columbus, Ohio, assignor to Norman Products Company, Columbus, Ohio, a corporation of Ohio
Filed Oct. 13, 1960, Ser. No. 62,418
4 Claims. (Cl. 200—83)

My invention relates to a fluid fuel flow control system for forced draft heating units. It has to do, more particularly, with a control system for controlling the fluid fuel supply valve of a heating unit of the forced draft type which includes a safety switch that controls said valve in accordance with draft conditions in the unit.

The present invention is particularly applicable to a forced draft heating unit of the fluid fuel type which includes a solenoid actuated fuel valve that controls the flow of fuel to a burner located in the combustion chamber. The combustion chamber is provided with an air inlet passage for supplying air for combustion to the chamber and with an outlet passage connected to a stack or chimney. The fuel valve is controlled in accordance with pressure differential conditions in the inlet and outlet passages as a safety factor to guard against the opening of the fuel valve when draft conditions are not proper for combustion in the combustion chamber due to blockages in the outlet passage or stack to which it is connected, a blockage in the inlet passage, failure of the blower, etc. According to my invention, the safety control for the fuel valve includes a safety switch connected in an electrical circuit with the fuel valve. This switch is of the diaphragm type and the opposite sides of the diaphragm are subjected to the respective pressure conditions in the inlet and outlet passages. The switch also includes a magnetic arrangement for preventing fluttering contact by being so arranged that a snap-action closing of the switch contacts occurs when the pressure differential conditions in the inlet and outlet passages are correct for combustion. The control system as a whole has improved characteristics over prior art systems and the snap-acting magnetic diaphragm switch is of improved construction and operation as compared to the usual diaphragm switch employed in the prior art.

In the accompanying drawings, I have illustrated diagrammatically a heating unit of the forced draft type which is equipped with my safety fluid safety switch but it is to be understood that this invention is not limited to the specific type of heating unit shown.

In the drawings:

FIGURE 3 is a view taken along line 3—3 of FIGURE 2 at one of the flat sides of the diaphragm housing.

FIGURE 4 is a detail of the switch contacts taken along line 4—4 of FIGURE 2.

FIGURE 5 is a fragmental sectional view taken along line 5—5 of FIGURE 2 showing the electrical contacts and the fluid line connections to the diaphragm housing.

Figure 1:
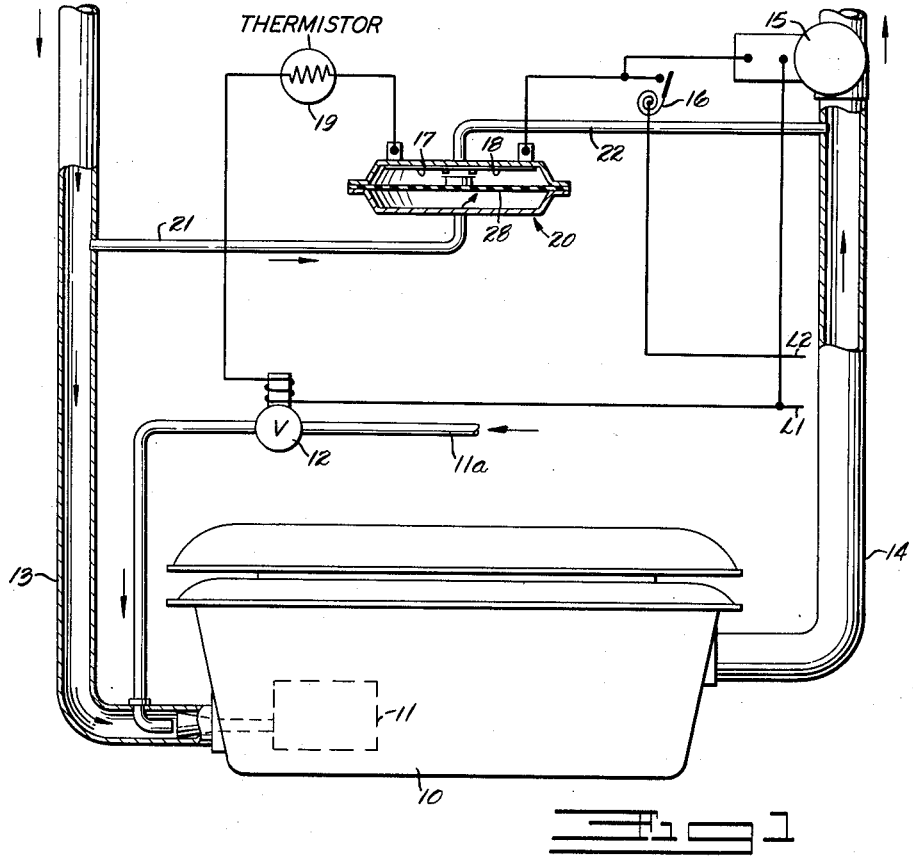
FIGURE 1 is a diagrammatic view showing my safety control system applied to a heating unit and having my switch illustrated in a schematic manner.

With reference to the drawings, I have illustrated my safety switch applied to a heating unit which latter may be of the general type illustrated in the patent to Campbell et al. No. 2,843,108, on July 15, 1958. However, it is to be understood that this heating unit is disclosed for illustrative purposes only and that my invention is not limited to this particular type of heating unit.

The heating unit is shown only diagramatically and is illustrated as comprising a combustion chamber 10. In the combustion chamber is a fluid fuel burner 11, for example a gas burner, which is supplied with fuel by a line 11a connected thereto and leading from a suitable source of supply and which is controlled by a solenoid type valve 12. An inlet air passage or conduit 13 leads into the combustion chamber 10 and supplies outside combustion air to the chamber and an outlet passage or conduit 14 leads from the chamber 10 to a flue, stack or chimney. A blower 15 is connected to the conduit 14 for creating a draft therein, for withdrawing the gases from the combustion chamber 10, and for pulling air into the combustion chamber 10 through the inlet conduit 13.

It will be noted that the inlet conduit 13 is of lesser cross-section than the outlet conduit 14 so that under normal draft conditions there will be be a greater fluid pressure in the conduit 13 than in the conduit 14. This will be a normal draft condition and only under this normal differential pressure it is desired that the valve 12 supply fuel to the burner 11.

The motor of the blower 15 is connected in an electric circuit in parallel with the solenoid coil of the valve 12 which is of the usual type and in series with the contacts of a room thermostat 16 of the usual type. In this control circuit, I also connect the contacts 17 and 18 of the safety switch of my invention which is of a magnetic diaphragm snap-acting type and is of novel structure and function. This safety switch is illustrated generally by the numeral 20. The contacts 17 and 18 are connected in series with the solenoid valve 12 and the thermostat 16 and in addition, I provide a time delay member 19, for example, a thermistor, which is also connected in series with the contacts 17 and 18.

The switch 20 includes a diaphragm housing and one side of this housing, the lower side as indicated in FIGURE 1, is connected to the inlet conduit 13 by a tube or line 21. The other side of the housing, the upper side as shown, is connected by a tube or line 22 to the outlet conduit 14. Thus, the diaphragm housing is subjected at its opposite sides to pressure conditions in the respective conduits 13 and 14.

The diaphragm housing includes the opposed pie-pan sections 25 and 26 illustrated as the lower and upper sections, respectively. The sections 25 and 26 are formed of relatively rigid material and the outwardly extending flanges of these sections are secured together by bolts 27 and clamp therebetween the peripheral edge of a flexible diaphragm 28 which may be of plastic, rubber or other suitable resiliently flexible material.

The contacts 17 and 18 are in the form of flexible strips of magnetic material which are clamped to the inner or lower surface of the upper housing section 26 by means of insulating terminals 29 at their outer ends and the strips extend radially inwardly toward each other but their inner ends are spaced apart at the center of the housing. Adjacent their inner ends, the contact strips are provided with the contact buttons or points 17a and 18a, respectively. The strips 17 and 18 are joined together at their inner ends by a tie bar 31 of insulating material which extends between the spaced contact points 17a and 18a. The contact strips 17 and 18 are spaced from the inner surface of the housing section 26 and this spacing may be varied by means of an adjusting screw 30 which is threaded downwardly through the section 26 and which engages a spacer 31a on the bar 31. The strips 17 and 18 are each provided with loops 32 which make them resilient with a tendency to spring their inner ends upwardly so that the member 31a will always contact the inner end of the screw 30.

The diaphragm 28 at its center is provided with a permanent magnet 35 which is suitably attached to the upper surface thereof as by adhesive. In surrounding relationship to the magnet and concentric therewith and with the diaphragm 28 is a contact ring or cup 36 which is suitably secured as by adhesive to the upper surface of the diaphragm 28. It will be noted that the cup or ring 36 projects upwardly from the upper surface of the diaphragm 28 a greater distance than the magnet 35. Thus, the magnet 35 is recessed within the upper flanged edge 37 of the contact ring 36. The contact ring 36 is of magnetic material and its flange 37 is so disposed that upon upward movement of the diaphragm the flange will contact the opposed contact points 17a and 18a of the respective contact strips 17 and 18. With no pressure differential conditions at the opposite sides of the diaphragm 28, the diaphragm is in normal or unflexed condition and the flange 37 of the contact ring or cup 36 is spaced from the contact points 17a and 18a.

Figure 2:
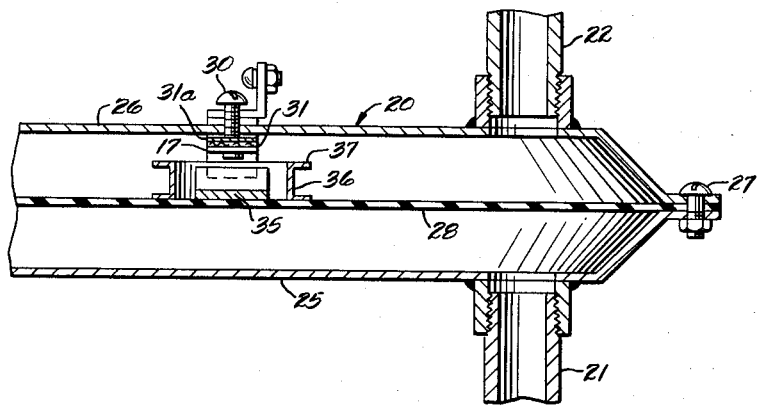
FIGURE 2 is an axial sectional view through the magnetic diaphragm safety switch of the system.

Assuming the heater unit is not operating, the switch 20 will be in the condition illustrated in full lines in FIGURE 2 with the diaphragm unflexed. At this time, the circuit to the valve 12 will be broken at the switch 20 and no fuel will be supplied to the burner 11. This is due to the fact that there will be no pressure differential at opposite sides of the diaphragm 28. However, as soon as the blower 15 is started, there will be a pressure differential created on opposite sides of the diaphragm 28. As previously described, there will be less pressure at the upper side of the diaphragm than at the lower side thereof which will cause the diaphragm to flex upwardly as indicated by broken lines in FIGURE 2. This will cause the contact ring 36 to move into contact with the contact points 17a and 18a which are carried by the strips 17 and 18. These strips are of magnetic material, as previously indicated, and therefore as the magnet 35 moves close to the strips, magnetic force will take over and snap the flange 37 of the ring 36 against the contact points 17a and 18a. Thus, pressure will flex the diaphragm 28 and move the contact ring 36 toward the contact points 17a and 18a but as the ring approaches the contact points, magnetic force will take over and complete the contact with a snap action. This will complete the circuit through the thermistor 19 and the solenoid valve 12. However, the valve 12 will not immediately open, as the electrical current through the valve circuit is initially limited by the thermistor 19 to a value less than that required for operation of the coil of the solenoid valve 12. After a predetermined, relatively short time interval, the initial resistance created by the thermistor will be reduced so as to increase the current flowing through the coil of the solenoid valve to a magnitude sufficient to open the valve 12. The short time delay created by the thermistor is desirable to prevent fluttering or fluctuations in the operation of the valve 12 which might otherwise occur should the switch 20 be only momentarily closed due to an accidental condition, such as a momentary downdraft in the air inlet conduit 13.

If for any reason the selected pressure differential conditions are not present in the respective lines 13 and 14, due to a failure in the forced draft, the switch 20 will automatically open and will break the circuit to the valve 12 so that the fuel supply will be cut off. The failure of the draft will permit the diaphragm 28 to return to its initial unflexed condition at which time the flange 37 of the contact ring 36 will break away from the contact points 17a and 18a. It will be noted that the magnet 35 does not contact the contact strips 17 and 18 but is spaced slightly therefrom even when the switch contacts close. This permits breaking away when the pressure differential conditions change minutely whereas if the magnet touched the contact points, it would be more difficult to break away the contacts due to the greater magnetic force immediately adjacent the magnet. Also, by maintaining the magnet in substantially spaced relation to the contact strips 17 and 18, arcing between the magnet and contact strips is prevented, and the resistance of the magnet is not imposed within the operating circuit for the valve 12.

The use of the magnet to supplement the closing of the contacts with a snap action prevents fluttering and undesired arcing between the contact members of the switch. If the magnetism is lost, the switch will open even more easily when pressure conditions require it to open and thus a fail-safe arrangement is provided.

It will be apparent from the above description that I have provided a safety switch for a forced draft heating unit by which the fuel valve is controlled in accordance with forced draft conditions in the unit. The control is effected by a novel control system including a combination diaphragm and magnetic switch having a snap action contact-making arrangement which prevents fluttering of contacts that would tend to create arcing and burning of contacts. This switch will operate on minute pressure differentials and the switch is of the fail-safe type.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described my invention, what I claim is:

1. A diaphragm-actuated switch comprising a housing having a flexible diaphragm therein adapted to be subjected to differential pressure, contact points in spaced relationship within said housing in cooperative relationship with said diaphragm, said contact points being spaced radially from the center of the diaphragm and away from the plane thereof, a connecting contact member carried by said diaphragm for movement therewith into engagement with said spaced contacts upon the occurrence of a proper pressure differential in said housing, said connecting contact member being a ring carried concentrically with the diaphragm and projecting outwardly from the plane thereof toward said contact points, and a magnet carried by said diaphragm adjacent said contact member for cooperating with said spaced contacts as the connecting contact member moves close thereto to complete the contact engagement with a snap action, said magnet being disposed within the ring and being disposed within the outermost extremity thereof.

2. A switch as defined in claim 1 in which the contact points are carried by contact strips of magnetic material mounted on said housing in normally spaced but cooperative relationship with said contact ring, said strips being resilient and being adjustable toward and from said ring to vary their normally spaced relationship.

3. In a pressure-responsive switch; a housing; a flexible diaphragm positioned within said housing and dividing the latter into a pair of oppositely disposed pressure chambers, said diaphragm being arranged for flexing movement within said housing in response to a differential of pressures within said chambers; a pair of relatively spaced switch contact members of magnetic metal positioned in one of said chambers in spaced relation to one side of said diaphragm; an annular metal contactor element carried by and projecting outwardly from said diaphragm on the side thereof adjacent said last-named chamber, said contactor element being normally spaced from said contact members, but being movable with said diaphragm upon flexing movement of the latter in one direction into circuit-closing engagement with said contact members; and a permanent magnet carried by said diaphragm within the confines of said annular contactor element and projecting outwardly from said one side of said diaphragm a distance less than said contactor element, said magnet being arranged to be magnetically attracted to said contact members upon flexing movement of said diaphragm in said one direction, but being arranged inwardly of said contactor element a distance to prevent engagement of said magnet with said contact members.

4. A pressure responsive switch as defined in claim 3, wherein said switch contact members are arranged for limited flexing movement within their associated chamber, and said housing is provided with externally accessible means connected with said contact members for adjusting the normal spacing between said contact members and said contactor element.

References Cited in the file of this patent

UNITED STATES PATENTS

| | | | |
|---|---|---|---|
| 1,914,949 | Hardgrove | | June 20, 1933 |
| 2,231,158 | Davis | | Feb. 11, 1941 |
| 2,335,471 | Ashcraft | | Nov. 20, 1943 |
| 2,359,168 | Somes et al. | | Sept. 26, 1944 |
| 2,468,768 | Malick | | May 3, 1949 |
| 2,537,474 | Mejean | | Jan. 9, 1951 |
| 2,598,556 | Judson | | May 27, 1952 |
| 2,704,571 | Reichelderfer | | Mar. 22, 1955 |
| 2,922,002 | Gilman | | Jan. 19, 1960 |
| 2,971,530 | Dewey | | Feb. 14, 1961 |